(12) United States Patent
Gardner

(10) Patent No.: US 6,628,283 B1
(45) Date of Patent: Sep. 30, 2003

(54) DYNAMIC MONTAGE VIEWER

(75) Inventor: Timothy Elliott Gardner, Bronxville, NY (US)

(73) Assignee: CodeHorse, Inc., Bronxville, NY (US)

( * ) Notice: Subject to any disclaimer, the term of this patent is extended or adjusted under 35 U.S.C. 154(b) by 0 days.

(21) Appl. No.: 09/547,490

(22) Filed: Apr. 12, 2000

(51) Int. Cl.$^7$ .............................. G06T 15/20
(52) U.S. Cl. ............ 345/427; 345/629; 345/634; 345/637
(58) Field of Search ............... 345/421, 427, 345/620, 624, 625, 629, 634, 637, 473

(56) References Cited

U.S. PATENT DOCUMENTS

| | | | |
|---|---|---|---|
| 5,440,401 A | * 8/1995 | Parulski et al. | 345/634 |
| 5,644,690 A | * 7/1997 | Yoshino et al. | 345/634 |
| 5,706,416 A | * 1/1998 | Mann et al. | 345/427 |
| 5,729,471 A | * 3/1998 | Jain et al. | 345/427 |
| 5,966,137 A | * 10/1999 | Murata | 345/629 |
| 6,137,491 A | * 10/2000 | Szeliski | 345/419 |
| 6,154,250 A | * 11/2000 | Honey et al. | 348/157 |
| 6,157,747 A | * 12/2000 | Szeliski et al. | 345/419 |
| 6,249,616 B1 | * 6/2001 | Hashimoto | 345/427 |
| 6,259,457 B1 | * 7/2001 | Davies et al. | 345/629 |
| 6,359,617 B1 | * 3/2002 | Xiong | 345/848 |
| 6,392,658 B1 | * 5/2002 | Oura | 345/473 |
| 6,393,162 B1 | * 5/2002 | Higurashi | 345/629 |
| 6,405,151 B1 | * 6/2002 | Fujii et al. | 345/427 |

OTHER PUBLICATIONS

"Coding Image Sequences for Interactive Retrieval" by Andrew Lipman and William Butera, Communications of the ACM Jul. 1989, vol. 32, No. 7, pp. 852–860.*

* cited by examiner

Primary Examiner—Mark Zimmerman
Assistant Examiner—Enrique L Santiago

(57) ABSTRACT

A method of displaying overlapping images of an object or space, each of which might be from different angles or perspectives on that object or space, which preserves the value of the detail of the individual images but yet juxtaposes them into a montage to provide a more complete view of the whole. Controls allow the entire montage to be scrolled or manipulated, but within the main part of the screen, the images are overlaid in sorted order where the image on the top is the one whose center is closest to the cursor from the overall perspective of the viewport. As the user moves the cursor or shifts the viewport, this order changes and new images are brought up while others get shuffled beneath them. By actuating a "bring-to-center" control, the montage is shifted so as to center a selected image free from perspective distortions, and a "locking" mechanism for this control enables it to repeat this shift with each frame of a movie thus selected in order to maintain the movie at center screen while the montage is repositioned behind in sync with the movement of the camera which took the movie.

18 Claims, 11 Drawing Sheets

Flow Chart for Opt-Out Actuator

FIGURE 2
Perimeter ("Sidewalk") Scroller
2.1
Cursor inside viewing area, no scrolling.
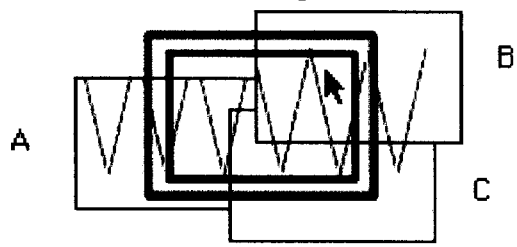
2.2
Cursor at perimeter scrolling, scrolling begins.
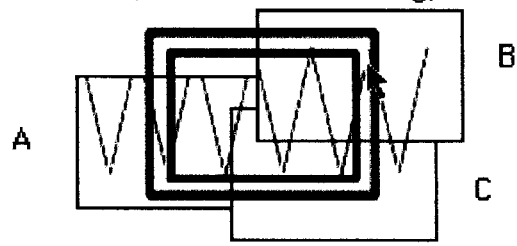
2.3
Scrolling continues.
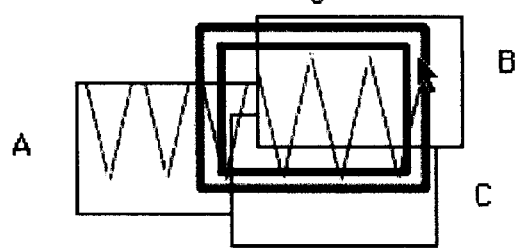
2.4
Scrolling stops at edge of montage.
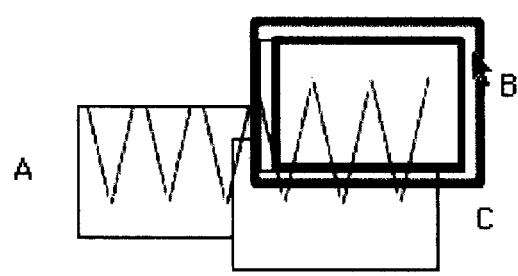

FIGURE 3
Dedicated Scroller
3.1
Cursor inside viewing area, no scrolling.
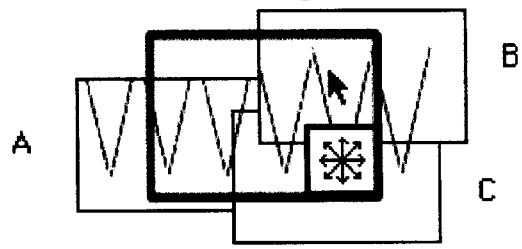
3.2
Cursor used to activate dedicated control and scrolling begins.
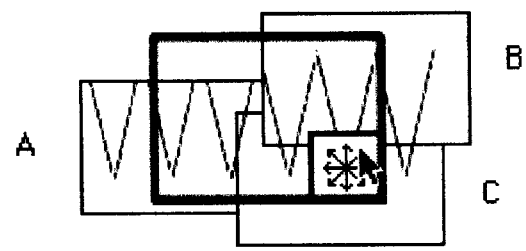
3.3
Scrolling continues.
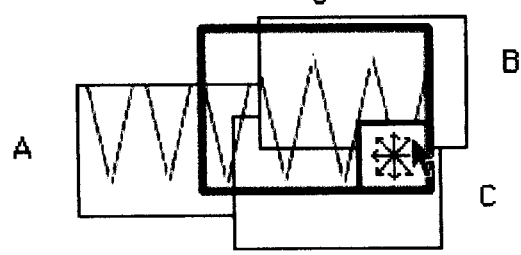
3.4
Scrolling stops at edge of montage.
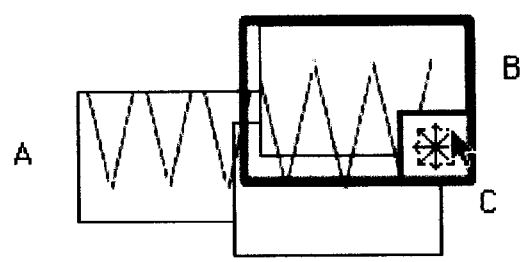

FIGURE 4
Three Dimensional Montage

4.1
Three images of a chair to be combined into a dynamic montage.

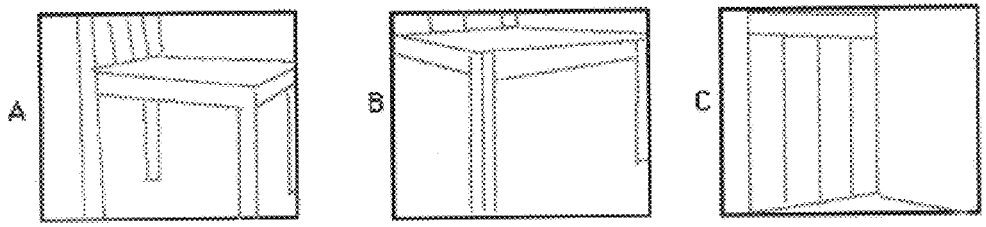

| 4.2 | 4.3 | 4.4 |
|---|---|---|
| Start scrolled to A with cursor over A and A on top. | Cursor moves toward C but is still closer to A. | Cursor moves closer to C which floats up. |

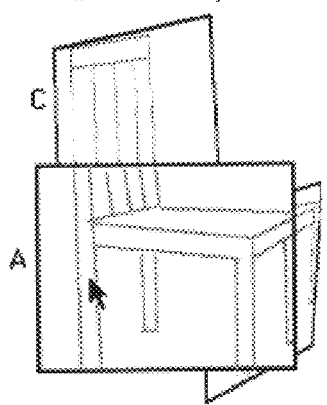 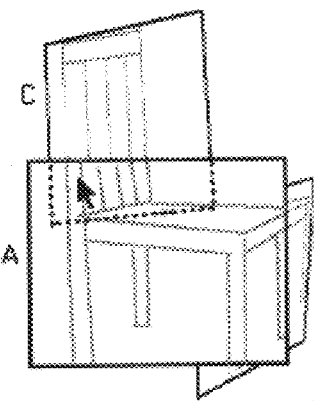 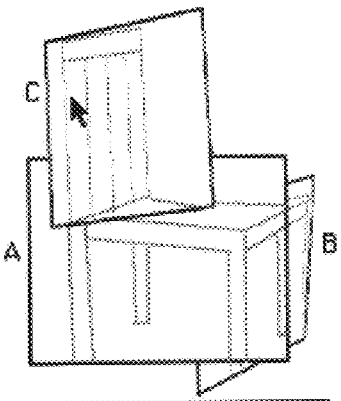

| 4.5 | 4.6 | 4.7 |
|---|---|---|
| "Centering" control activated causing scroll to C. | Cursor moves down over both A, B, and C but still closer to C. | Cursor moves closer to A which floats up. |

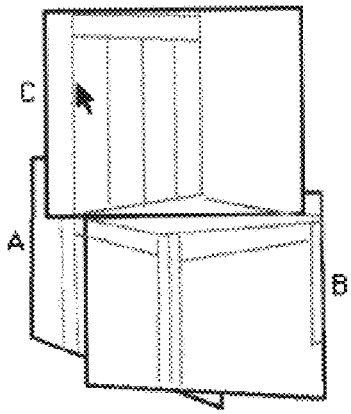 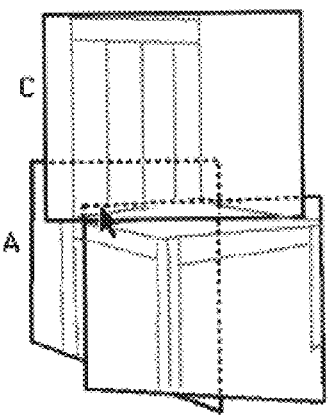 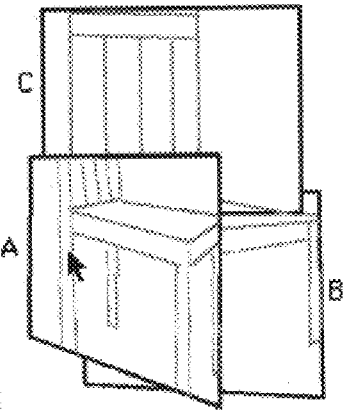

Image Coordinates and Image Plane

FIGURE 6
Example Cursors for Navigation
6.1  direction indicated
6.2  zoom in
6.3  reverse course Hard-Wired Montage Navigation
Two Types of Rotation Transition (from figure 7.2)

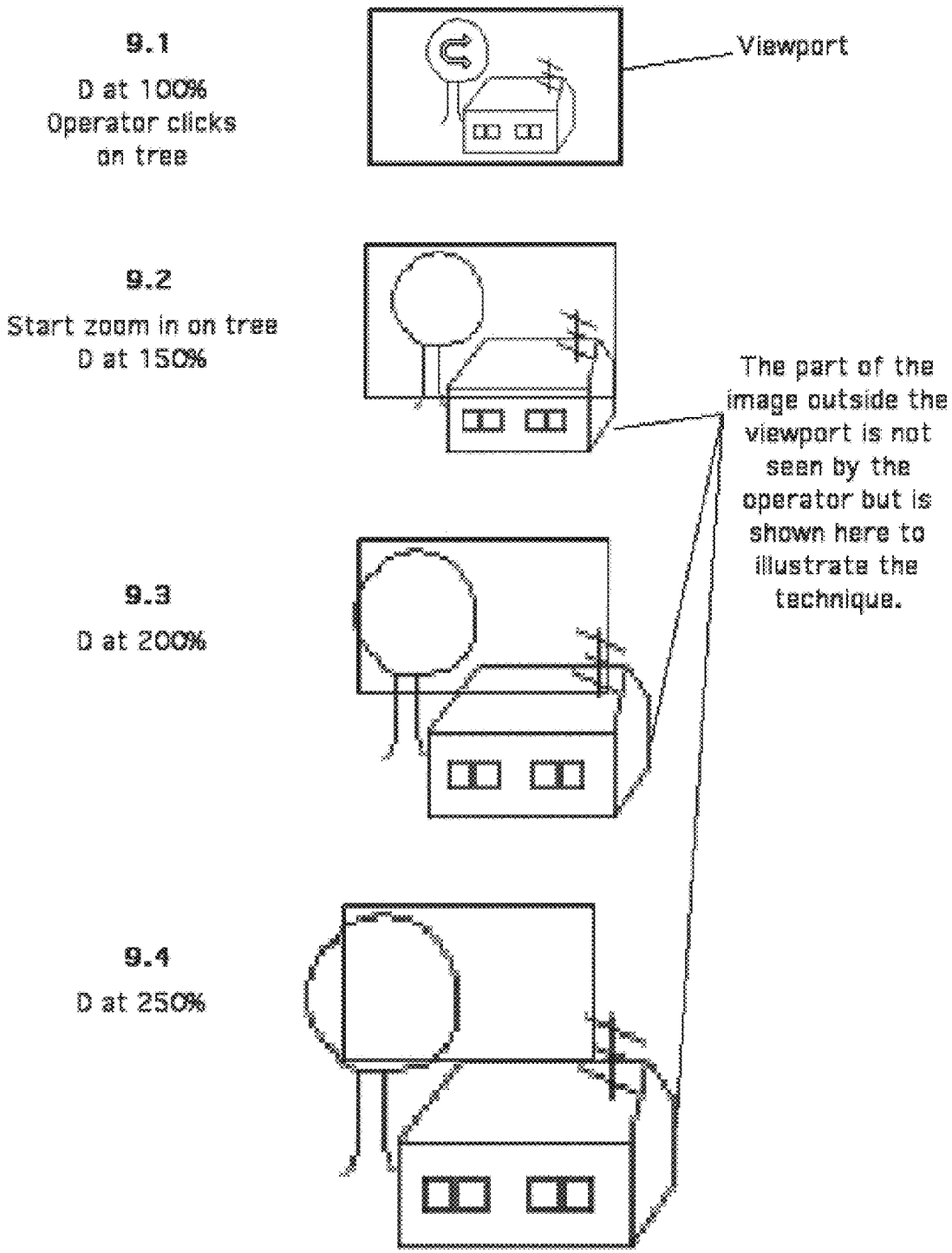

Hard-Wired Montage Navigation
Zoom-and-Switch Transition (from figure 7.10)

9.5
D at 300%

9.6
Start pan right.
D at 300%

9.7
Switch images on movement
A at 300%

Hard-Wired Montage Navigation
Zoom-and-Switch Transition (from figure 7.10)

DYNAMIC MONTAGE VIEWER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Most amateur photographers have faced the situation where, lacking a very wide angle lens, the object that they wish to photograph is too big for their camera to capture in one photo.

One common and easy solution is to take several overlapping pictures and then when the photos are developed, mount them in an overlapping fashion into a montage which gives a more complete view of the object than any single picture. As can be easily imagined even if one has not experienced this directly, the resulting images are unlikely to fit together exactly. Indeed, there is a fundamental problem with perspective as the two-dimensional images of the object from the slightly different angles will not perfectly line up due to the expected distortions of perspective. But in spite of this technical limitation, this low budget technique works quite well because the viewers bring the visual experience necessary to mentally correct for the distortions. People are quite accustomed to looking at photographs and imagining the three dimensional objects and are remarkably sophisticated in intuitively understanding of the perspective shifts involved, so the montage works in spite of the perspective problems.

By way of definition, whenever montage is used here it is to refer to a montage in which the relative location of the pictures matters and where the goal is to capture a bigger object or space. It does not refer to the more commonly used type of montage also known as collages such as one of a family vacation in which pictures of the kids at the beach are perhaps trimmed out of a picture and pasted next to a picture of the hotel the family stayed at one night which is in turn partially covering a picture of a sunset over the lake. Nor does montage, as used here, refer to the type of montage done in a "photomosaic" in which tiny unrelated pictures are used as tiles in the same way an artist dabs paint to create a larger but unrelated image.

Recent computer software such as Apple Computer's QuickTime VR™ (QTVR) attempts to interpolate multiple two dimensional images into a three dimensional interactive model. This approach has the advantage of a more realistic result. QTVR relieves people of the need to exercise the mental translation necessary in the case of the montage, but it does so at a price: the object's representation is based on mathematical interpolation which may not always reflect the actual geometry of the object. People who to study the various images used to create the QTVR model might take away a better, fuller understanding of the object than people who view only the QTVR model.

Another alternative is to use a video or movie camera to capture the object. The camera roams around the object, capturing a movie which covers its entirety. Since a movie camera is simply taking a series of still images which are then played back in rapid succession, it is not a different way of capturing the object but rather just a different way of viewing the results. Instead of a montage, we look at a movie. Indeed, it is possible to print out photos of the individual frames of the movie and then arrange them into a montage. Initially this seems like a strange concept because one expects the movie to be more useful. Indeed, in some ways it is. The movie provides the opportunity for the camera to inject the observations of the photographer. As the camera pauses on details of particular interest, the photographer is pointing out to us the highlights. Artful control of the camera in the form of zooms and pans can also add to the usefulness of the presentation.

But, perhaps surprisingly, the montage can be a more useful result in some situations. More of the entire object or space can be seen at one time, and viewers can look at those details they are most interested in within the context of a more complete overall view. Instead of being trapped within the frame of the photographer's vision, they can explore the object with their own agenda. Unless the goal of the viewing is to understand the vision of the photographer, as it often is in a fiction film for example, it can be argued that the montage provides a better interface for viewing the content.

Traditional paper-based montages suffer from a number of limitations. When two images overlap, only one of them can be seen. Since the images are likely to represent slightly different perspectives, no one image is necessarily superior to the others, but the traditional montage throws out the overlap. By flattening all the images into a two dimensional display, the perspectives of the photographs are not corrected for. Finally it would be difficult to automate construction of a traditional montage, and they are cumbersome to manipulate.

BRIEF SUMMARY OF INVENTION

This invention is a method for viewing a two or three dimensional montage. By moving the montage into the electronic realm, a number of features become possible which were not possible with a paper montage. Unlike traditional montages, an electronic montage does not need to throw away the data when one image covers part of another, instead, the viewer can be allowed to dynamically choose the order in which the images are overlapped. In one such scheme the images are positioned based on the relative coordinates of their content (as in traditional montages) and then layered in order of the distance from the cursor to their center, with the ones closest on top. As the cursor moves over the montage, the order is changed and the images closest to the cursor float up to the cursor for full view. Controls for scrolling are added to allow the inspection of montages which are too large to fit within the viewing screen.

A traditional montage is usually a two-dimensional creation, but with a bit of imagination the basic concept can be extended into three dimensions. Suppose, for example, that the object to be studied is a chair. A number of still photographs are taken of.the chair from several sides and a number of angles. A three dimensional montage can then be created by taping the images together to create a model of the chair. One can imagine that with some cutting or folding or bending or clever suspensions with wire, the two-dimensional images might be connected into a three-dimensional form. Indeed, such a display might lend itself to interesting art since the medium would allow the artist to reveal elements in one view which are hidden in another.

In a software implementation, this invention (the "Dynamic Montage Viewer") has a number of advantages over the tape and wire contraption. First, it is not constrained by gravity. The images need not be taped together, but rather can just be projected onto a screen as if they were hanging in space where they should be. The viewer presents the images in their proper projections for their position in the three dimensional space they describe. Second, in a paper based three-dimensional montage, parts of some of the pictures are likely to be cut off or hidden in the folds and cuts. In the Dynamic Montage Viewer, the full images can float to the top as described above. An additional "bring-to-center" control is added which allows the entire montage to be scrolled and rotated into position so that the topmost image is also centered and unaltered by perspective transformations.

Earlier, using single frames from a movie was described as a method of capturing images to be used in the montage. This is seen as a very efficient method of collecting data for the Dynamic Montage Viewer. However, when used in this manner, the temporal information in the movie is lost. For certain types of objects, such as a chair, this may not matter, since the images are not likely to change within the course of the movie. However, for other objects or spaces, the temporal information is also important because the object or space changes through time. Fortunately, it is easy to include temporal information in the dynamic montage viewer. Each of the images in any of the montages described above could just as easily be a movie taken by a stationary camera once that is mentally pictured, it is not difficult to relax the constraint that the cameras are stationary. The operator now sees the non-stationary images float around the screen through time. A "locking" feature is added to the "bring-to-center" control to allow the operator to choose to start "tracking" a movie so that it's current frame stays full size while the other images and/or movies are reprojected behind it over time.

High-profile sporting events are tracked by a multitude of cameras. Presented in a dynamic montage, the user could choose a preferred angle and point of view dynamically rather than simply following the edits of the sports department. A dancer can be recorded from multiple angles by multiple movie cameras and the result assembled into a montage which can be viewed dynamically by dance students or dance lovers. A Dynamic Montage Viewer browser plug-in can give online auction shoppers a more complete understanding of the objects they are interested in. Virtual tours of historic or remote places and objects can be created as dynamic montages with image gathering equipment no more sophisticated than a camera. For montages which are not time-sensitive, coverage can be augmented by adding more images.

Like the paper-based montage, the Dynamic Montage Viewer demands that the operator mentally translate two dimensional projections into three dimensions and draw on real-world understanding and experience in interpreting the results. This is its obvious weakness and yet it is this that is perhaps its biggest strength. It allows users to interpret the unaltered image data for themselves and leverage all the knowledge and experience they bring with them to the viewer.

BRIEF DESCRIPTION OF THE DRAWINGS

FIG. 2 shows how the perimeter of the viewport can be used as a control to scroll the montage.

FIG. 3 shows how a dedicated scrolling control can be used to reposition the montage.

FIG. 4 shows how the viewer reorders the layers in a three dimensional montage and how the "bring-to-center" control works to "center" an image.

FIG. 6 shows a list of possible cursors which can be used in a hard-linked dynamic montage controller to indicate navigational directions.

DETAILED DESCRIPTION OF THE INVENTION

Float-Up Feature

Figure 1:
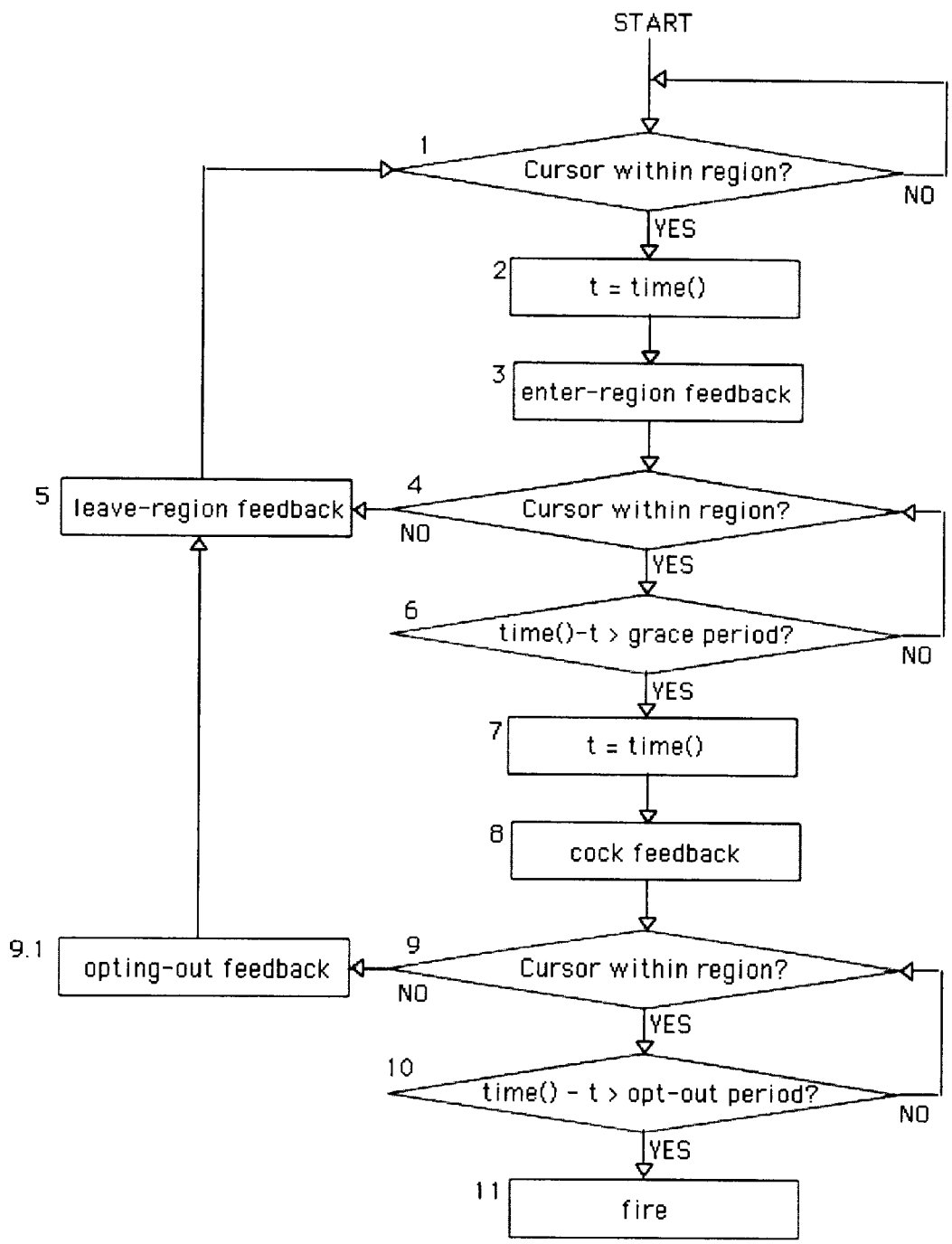
FIG. 1 shows how a Dynamic Montage Viewer can reorder the layers as an operator moves a cursor over the montage.

FIG. 1 displays the operation of a Dynamic Montage Viewer with a "float-up" feature which causes dynamic reordering of the layering of the images. A zig-zag line (FIG. 1.1) is the two dimensional surface to be photographed, and three photographs (A, B, C) are taken of different portions of the zig-zag. The three images are laid out in an overlapping fashion so that their positions reflect the relative position of their contents; that is, the resulting montage looks as much like the full zig-zag as possible. When the cursor is closest to the center of image A, this image rests on top of the other two. In FIG. 1.2, the cursor is closest to the center of A and farthest from the center of C, so the order chosen is A, B, C from top to bottom. FIGS. 1.3 to 1.5 show the effects of moving the cursor over the montage. The distances are simply the linear distance between the two points. (square root of the sum of the squares of the differences of the coordinates).

Rotation/Translation Controls for Two-Dimensional Montages

For montages too big to fit fullsize on the viewport (display device's screen), controls must be added to enable the repositioning of the montage behind the viewport. There are a number of interfaces which would allow this. One such method would be to allow the arrow keys on the keyboard to'scroll the montage up, down, left and right. Another would be standard scroll bars. Another reasonable choice would be to use the cursor when it is near the perimeter of the viewport to indicate the direction of scrolling desired. This possibility is illustrated in FIG. 2. A "sidewalk" portion of the outside perimeter of the viewport is reserved for initiating scrolling. This area should be as small as possible while still making it convenient to initiate scrolling so as not to interfere with the main work of the cursor which is to dictate the order of the layers. In FIG. 2.1, the cursor is instigating the ordering B. C, A and no scrolling is taking place. However, when the cursor moves into the "sidewalk" portion as in FIG. 2.2, scrolling begins. Scrolling continues in 2.3 until it reaches the end of the covered portions of the montage in FIG. 2.4. While such a scroller could be programmed to allow the user to scroll beyond the scope of the montage, it is preferable that scrolling be restricted to some reasonable subset of the entire plane to prevent the user from getting lost.

Another interface for scrolling is a dedicated control as is illustrated in FIG. 3. In FIG. 3.1 the cursor is over image B, eliciting the ordering B, C, A. But in FIG. 3.2 the cursor moves onto the dedicated control and initiates scrolling to the top right. In FIG. 3.3 the scrolling continues until it reaches the edge of the montage in FIG. 3.4.

Many such interfaces for scrolling the montage are possible as evidenced by the variety of similar controls in other programs. The exact nature and/or range of the viewport controls is preferably customized for the particular montage.

Bring-To-Center Control

In addition to standard controls for scrolling the montage behind the viewport, an additional "bring-to-center" control enhances the operation of the viewer. This control, when activated, causes the montage to scroll so that the current topmost image is front and center. This feature can either replace or coexist with the float-up feature. In the case of coexistence, however, the interface must be designed to allow for both controls. Since with the float-up feature active, the topmost image depends on the position of the cursor, so the bring-to-center control could.either be activated by a mouse click, keyboard command, or other input which does not require moving the cursor. It is not expected that this will need to be done, but for purposes of argument if an implementation motivates the implementation of a bring-to-center control with a cursor based action which requires moving the cursor, this can be accomplished provided the interface allows the operator to. "freeze" the layering and suspend the float-up feature which causes the dynamic reordering thereby freeing the cursor from the selected image in order to activate a bring-to-center control.

Image Coordinates

Having described two external features of Dynamic Montage Viewers, we now turn to the internal data structures and operations needed to maintain and display two and three dimensional montages.

For the dynamic montage to be able to display a set of images, it must be provided with a set of the relative coordinates of the vertices of the images in 3-space. These coordinates can be derived from the coordinates and orientation of the camera, the magnification (field of view) of the camera, and the center of focus of the picture. When the images are taken of a two dimensional object, such as the zig-zag of FIGS. 1, 2, and 3, and the.images are taken from a position perpendicular to the object and with a normal focal-length lens, a reasonable simplification (to be argued against later) is to assume that the images lie in 2-space and to consider only two coordinates for each vertice. It would be possible to automatically compute these coordinates by attaching some sort of gyroscope on and GPS device mounted on the camera and some sort of homing device on the object. However, in the absence of such a setup, the task can be performed manually by moving the images around until the edges most closely match up. They are not likely to match up exactly due to expected perspective distortions, but the goal of making them fit best in the judgement of a human eye is conducive to a manual process anyway, since a human might prefer a slight shift from the "true" coordinates in order to emphasize the "important" elements of the photograph. For example, consider two photographs of a person, one of which shows the person's right side and one the person's left. It may be subjectively preferable to have the lines of a face line up even if it meant that the legs had a bigger mismatch. Many popular image editing programs allow this kind of manipulation of images and can be adapted to output the proper coordinates, if by no other means than printing the result and manually measuring the distances on the printout.

Figure 5:
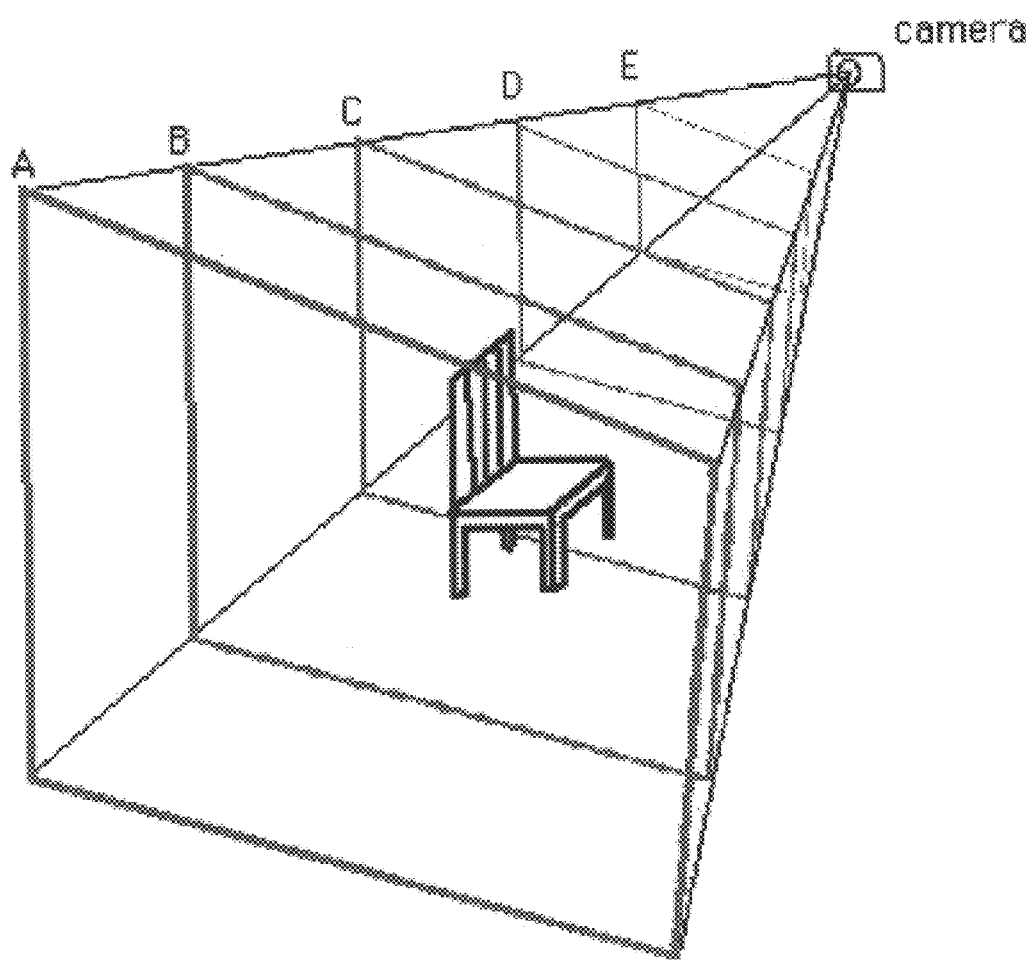
FIG. 5 shows the "pyramid" view of a camera taking a picture of a chair. This figure helps one visualize how the 3-space coordinates to be associated with the photo are chosen.

For a three dimensional montage, all the vertices of the images have three coordinates: x, y, and z, but the images are positioned on the screen based on their projections onto the two dimensional viewport. FIG. 4 illustrates a three dimensional montage. In FIG. 4.1, three "photos" of a chair have been taken from three different positions. Coordinates in three-space are associated with each corner of each photo. The photos themselves represent projections of everything within a four sided pyramid whose vertex is at the camera. FIG. 5 shows a camera taking a picture of a chair. Rectangles A, B, C, D, and E are slices of the pyramid. There are an infinite number of such slices but we need to choose just one in order to associate the image with 4 points in space. The plane which contains the center-point of focus of the camera is the one chosen. In FIG. 5, this is rectangle C. (Note that this rectangle does not correspond to images A, B, or C in FIG. 4 as it is much too big.)

As was mentioned in the discussion of the construction of a two-dimensional montage, by attaching some sort of GPS device and gyroscope onto a camera, and configuring the camera to record its zoom setting, angle, latitude and longitude and focus along with the image, it might be possible to automatically compute these coordinates. Indeed, one can imagine a digital camera with a built in Dynamic Montage Viewer and appropriate controls for adding and deleting images to a given montage. However, in the absence of such an automatic mechanism, the coordinates can be calculated manually by manipulating the image until its skewed, slanted and resized representation best matches the defining lines of the other images and observed center of focus, and then transforming the coordinates into their reverse projections. The process can be iterative so that if an image does not appear correct in the viewer, the coordinates can be tweaked until it does.

Projection

In order to project the coordinates, a view plane in three-space and the coordinates of the operator's "eye" are chosen. For example, suppose the vertices of A in FIG. 4.2 are top left (−12, 10, 0), top right (12, 10, 0), bottom right (12, −10, 0) and bottom left (−12, −10, 0), and suppose the view plane is z=10 and the eye is at (0, 0, 20). To calculate the projection of A onto the view plane, a line is drawn in 3-space between each of the vertices and the chosen eye. The intersection of that line with the view plane is the projected point. In this example, the projected vertices are (−6, 5, 10), (6, 5, 10), (6, −5, 10), (−6, −5, 10), and the two-space projected vertices in the view plane are (−6, 5), (6, 5), (6, −5), and (−6, −5).

In this fashion, the projections of all the vertices of all the images are calculated. Next, the coordinates of the cursor are calculated based on the position of the viewport. In FIG. 4.2, if the view plane is taken to be z=10, and A is as was calculated above, the cursor appears to be somewhere near (−4, −1, 10), assuming that the cursor lies in the view plane. For the float-up feature, the distance between the cursor and the centers of all the images is then calculated to determine the layering of the images. Otherwise the ordering can be determined based on their distance from the center of the viewport. The images are then mapped onto the two-space projections of their vertices. Current off-the-shelf development packages allow the mapping of a rectangular image into a particular "quad" so the details of this procedure are not discussed here. If the projected coordinates of the left side of the image are to the right of the projected coordinates of the right side, the image is backwards so it is not drawn but instead filled in with a solid color or alternatively drawn with some kind of blended transparency over it to inform the viewer that it is the backside of the image.

Operation

The operation of a dynamic montage scroller with a float-up and a bring-to-center feature can now be described for the three dimensional montage. In FIG. 4.2, the cursor is closest to image A which is displayed on top of the projected images B and C. In this figure, the position of the montage determines that A is displayed in "centered" position unaltered by perspective transformations. In 4.3, the cursor moves up towards image C but is still closest to image A, so no change takes place. But in image 4.4, the cursor becomes closer to C than to A, so the layering is changed so that image C floats up over image A. FIG. 4.5 shows the result of a user activating the "bring-to-center" control from the position of FIG. 4.4. The montage is rotated and tilted slightly so as to position image C parallel to the view plane and cause its projection to be free of perspective transformations. In FIG. 4.6, the user moves the cursor away from the center of C so that it enters the projections of B and A but it remains closest to the center of C, so the ordering is unchanged. In 4.7, however, the cursor becomes closest to the center of A, causing the reordering of the layers to A, C, B from top to bottom. If in FIG. 4.7 the user activated the "bring-to-center" control, the montage would be shifted so that the final position-would be that of 4.2.

Cursor Position

In the absence of three dimensional input devices, the cursor is typically operating in a two dimensional space and was assumed to lie in the view plane in our calculations above. FIG. 4.4 showed the result of moving the cursor far enough away from the center of image A and close enough to the center of image C that image C was raised to the top. However, our assumption that the cursor is in the view plane will bias the ordering towards the "centered" images since the 3-space distances will be shorter. For some montages, this weighting may make it difficult or impossible to access the non-centered images, in which case, the distances can be calculated as a function of A. the distances between the three dimensional coordinates of the cursor and the three dimensional coordinates of the centers of the images in three space as above, and B. the two dimensional distances between the two dimensional coordinates of the cursor on the screen and the centers of the two dimensional quadrilaterals which are the projections of the images.

There are a large number of specifications for this function which are reasonable. A weighted average is reasonable. One could even allow the user a slider to specify the weighting they preferred. A function that favored the 3-space distance except when the 2-space distance was very low might work as well, especially if there was some visual indication of when the 2-space distance was dominant.

An alternative method of addressing the same issue is to allow the user to change the size of the cursor to simulate depth. For example, a certain key could be linked to moving the cursor in and out of the screen. In this case, the cursor would no longer lie in the view plane but rather along a perpendicular to it at the indicated distance.

Three Dimensional Treatment of Two-Dimensional Montage

Returning to two dimensions, it is important to note that the two dimensional montage is just a special case of the three dimensional one. In the two dimensional montage, the points associated with the vertices of the images all lie in the view plane. It is more exciting to realize that this simplification need not be done at all. By using the three dimensional coordinates the two dimensional object or space will look more realistic since with the slight perspective transformations performed due to the camera's slightly different angles, the images will line up more perfectly with each other. This means that less mental translation is required of the operator when the two dimensional montage is treated as a three dimensional one than with a traditional cut and paste montage. In other words, the resulting montage would look more realistic.

The techniques used to display a three dimensional montage can also be used to display two dimensional montages in which the images are not all taken from same distance from the surface of the object. For example, if one image is a "zoomed-in" image of a particular detail of the object, it might not be desirable to have this detail cover up the portions of the object that surround it in an unzoomed image. If one were creating a montage from paper, one might use a copy machine to reduce the size of the image, and then paste the reduction into the montage. In like fashion, the Dynamic Montage Viewer displays a reduced size projection of the image.

Since a lossy reduction of the images would compromise one of the goals of the invention, namely allowing the viewing of the object without data loss, the full images are retained in memory or on disk and the image is projected into the smaller perimeter in the same manner as was done for the images of the three dimensional montage. When the user chooses to activate the "bring-to-center" control on a reduced image, the other images are expanded behind it. Hence the Dynamic Montage Viewer can accommodate images with different levels of magnification, even with two dimensional montages, without throwing out any data.

Rotation/Translation Controls for Three-Dimensional Montages

There is no viewport shown in FIG. 4, but one is needed for montages larger then the available screen. Controls such as those described in FIGS. 2 and 3 could be added if extended to control movement along all three axes. As was true with the two-dimensional montages, it makes sense to constrain the viewport controls to positions which take advantage of the available images in the montage, with some attention given towards making the positional changes consistent and smooth. And again, the parameters and ranges of those controls are preferably tuned to the montage.

Figure 7:
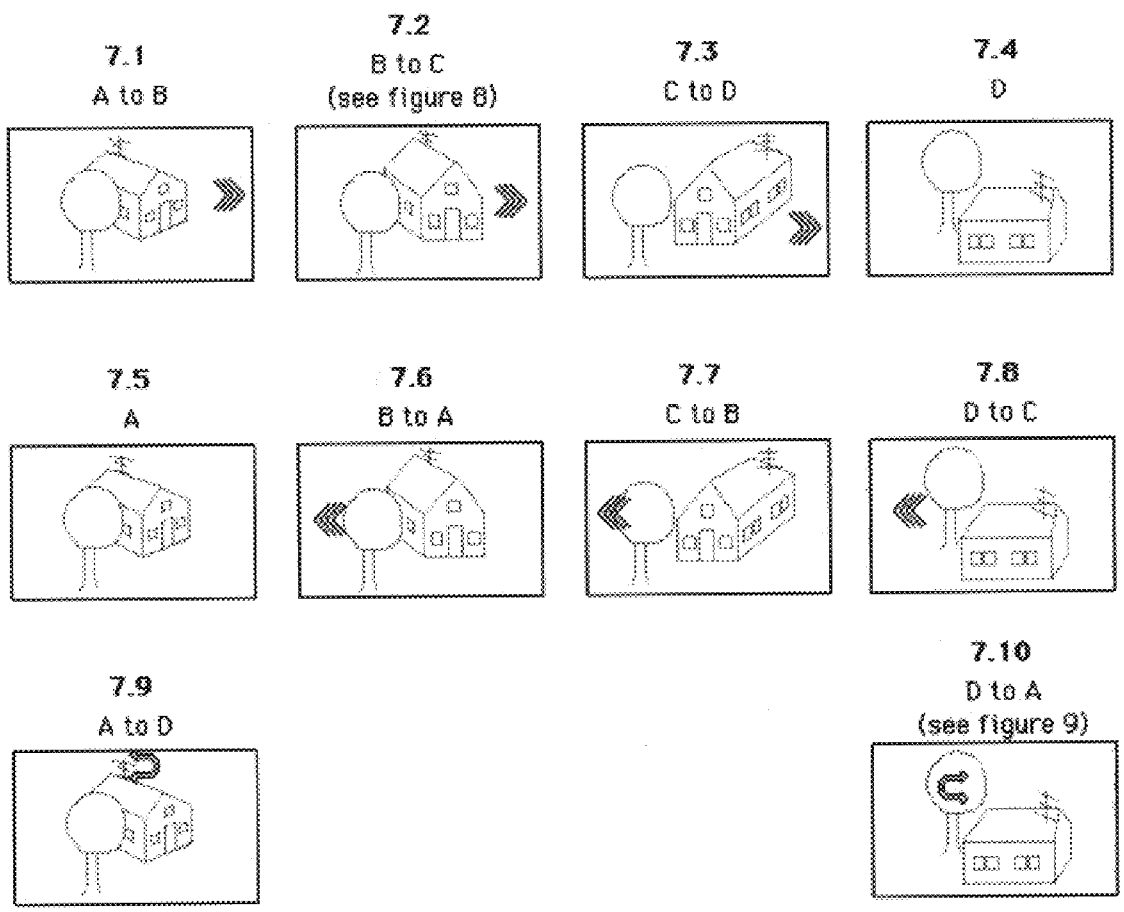
FIG. 7 shows some of the cursors applied to a montage composed of four pictures of a house.

It is sometimes more useful to connect particular parts of the images to translations and rotations of the montage than to provide general purpose scrolling controls. Such a technique can be used to provide a more guided virtual tour of an area while still allowing the operator considerable freedom. By changing the cursor's shape to point in the direction of the rotation which would be taken on a click, a useful interface for exploration is established, and the range of exploration is limited to whatever is desired by the tour developers. FIG. 6 describes some sample cursors which can be hard-wired into a montage for navigation. FIG. 7 displays four images, A through D, all taken of a house. From a position on a street in front of the house facing it, image A is taken from the far left, image B from the immediate left, image C from the right, and image D from the yard almost to the back of the house on the right side. The images are hard-wired to enable transitions from A to B to C to D going right (FIGS. 7.1–7.4), and D to C to B to A going left (FIGS. 7.5–7.8). Additionally, it is possible to swing a full 180 degrees from A to D (FIG. 7.9) or D to A (FIG. 7.10).

Figure 8:
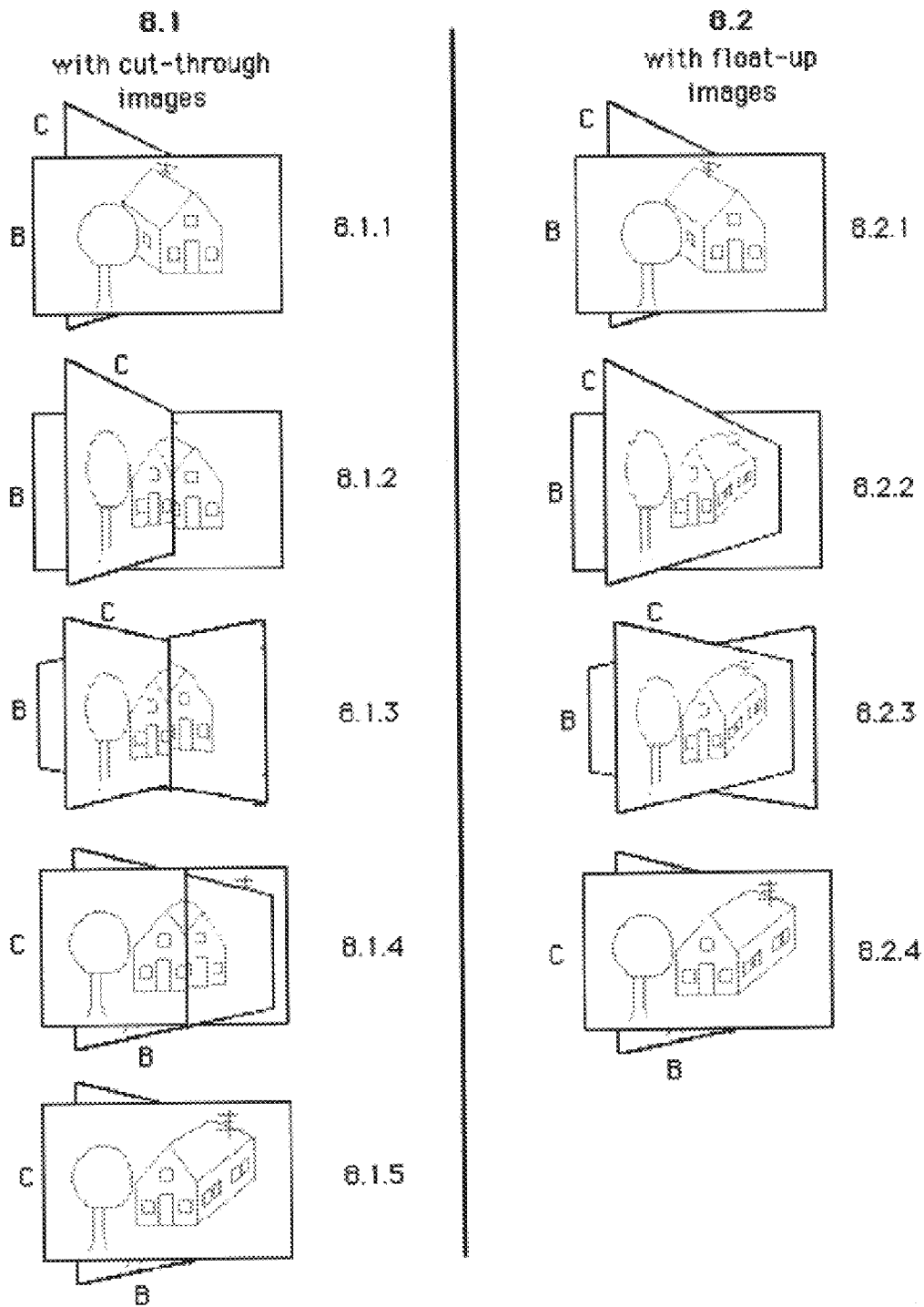
FIG. 8 shows a rotation transition between two of the pictures from FIG. 7.

FIG. 8 shows several of the intermediate steps in the transition from B to C. In FIG. 8.1, the images cut through each other as one would imagine they would if one made a paper montage out of the photographs by cutting slits in them and sliding them together. FIG. 8.2 shows how it would look in the presense of the float-up principle, where image C floats up and then the montage rotates to bring it to front and center.

Zoom-And-Switch

Figure 9B:
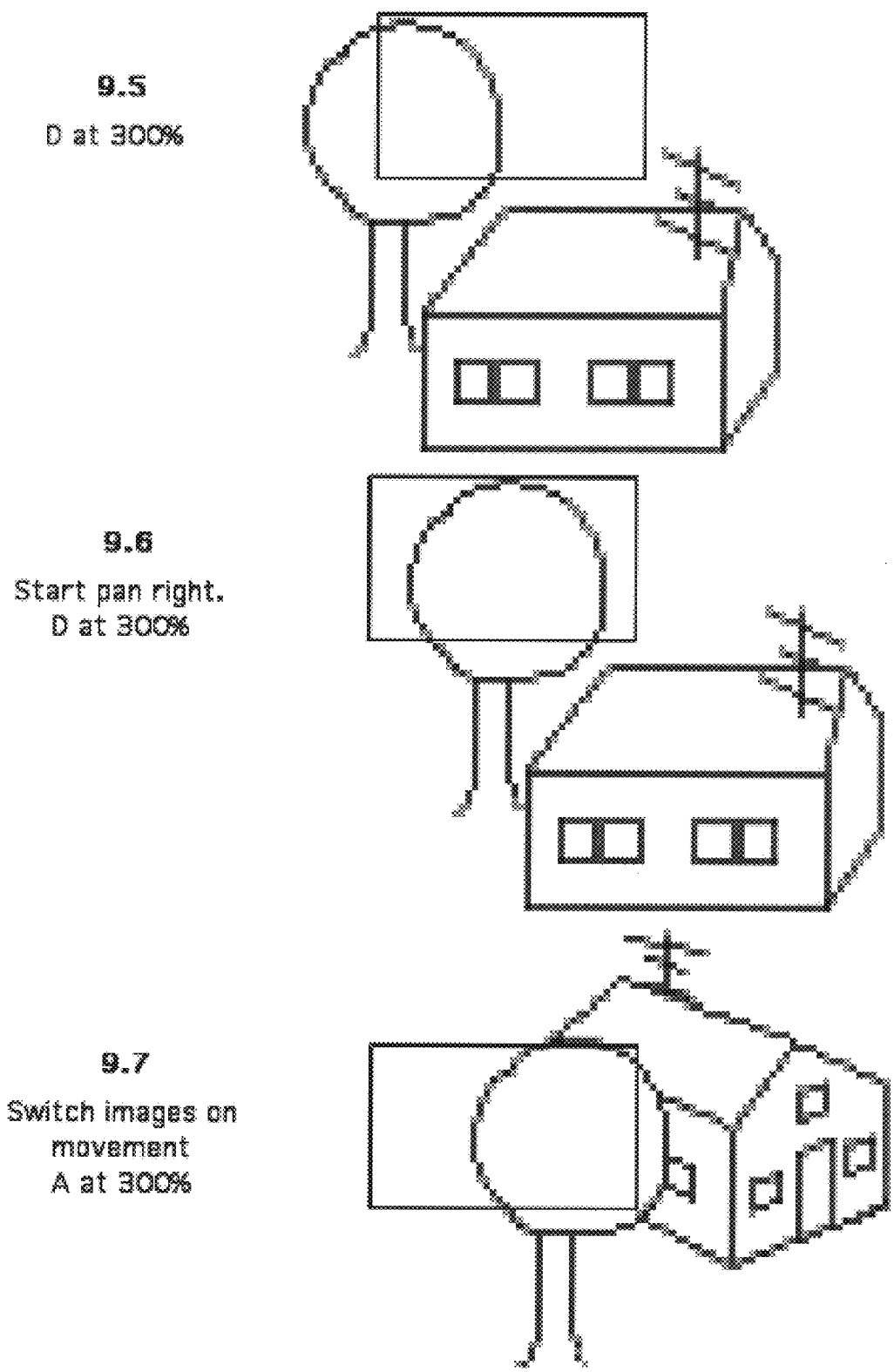
FIG. 9 shows a zoom-and-switch transition between two of the pictures from FIG. 7.
Figure 9C:
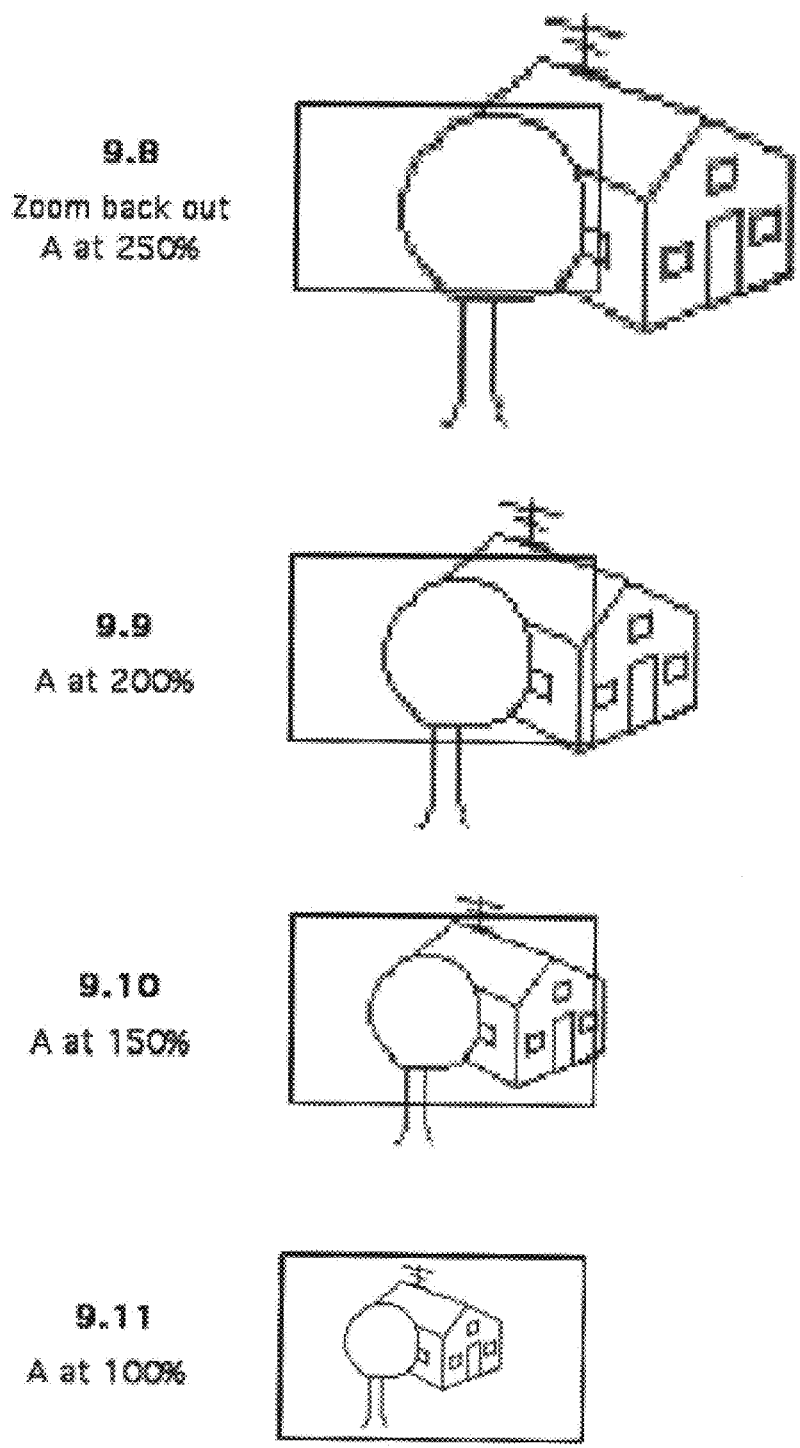

FIG. 9 shows how a customized transition can make the movement from one still image to another appear to be continuous. A region with a high degree of similarity is chosen in both images. In this case, both images A and D have a tree which serves this purpose well. The "zoom-and-switch" technique works by zooming into one side of the similar area in one image, then panning across it and at a point of high movement within the pan, switching to the second image and continuing the pan. Finally, the image zooms out to full size, and the sleight of hand is complete. There are two main reasons this works well. First, when the image is zoomed, the effect of movement is multiplied. For example, it is very difficult to move a powerful telescope smoothly enough to follow a slow moving object because relative to the view area of the telescope, it is moving very quickly. So the first advantage of this customized transition is that the fast movement masks the switch. The second advantage is that by zooming in, to a region that is similar, the display of the parts which are not similar is gone, so the sudden change to those parts of the images is never seen.

Hidden Images and Image Outlines

An additional outline-display feature needs description. In FIG. 4.3 a dotted line is shown which is the outline of the part of image C which lies beneath image A, while in FIG. 4.2 the dotted line is not shown. The dotted lines aid in understanding the relationship between the images, but they can detract from the composite view of the images (montage). A setting which allows the user to turn on and off the dotted lines is a valuable feature of the viewer. One implementation would be for a certain keyboard key to toggle the display of all dotted lines on or off. But in FIG. 4.3, only the dotted outline of image C is displayed, not that of image B. This is because a third cursor-sensitive setting is desirable. When the cursor is within a quadrilateral which is at least partially in a lower layer, the outline of that quadrilateral is displayed as a dotted line.

Montages of Movies

As was previously described, it is possible to include movies in the montage. It should be noted that if the movies contain time-sensitive information, sychronization information is needed in order for multiple movies to be used in the same montage. If the movies, do not contain time-sensitive information, then it makes more sense to treat the individual frames as a set of independent images, since they can then be displayed continuously instead of only at the points in time corresponding to their occurrence.

If time-sensitive synchronized sequences of images (movies) are available, the montage itself can change over time. In this case, the viewer displays controls for play, rewind, step forward, step back, fast forward, stop, etc. During play mode, the images are drawn in the same manner as described previously except that at each time interval the projections must be recalculated and redrawn for any images which have changed. In watching such a presentation, one might see the quadrilateral which is the projection of a movie's frame "travel" around the viewport as the camera shifts position over time.

Bring-To-center Lock

A final feature is relevant only to montages which contain at least one movie. A "locking" feature is added to the "bring-to-center" control which, when activated, causes the viewport to continuously reposition itself so as to keep a particular sequence of images (movie) centered and free of distortion.

Scope

Although the description above contains many specificities, these should not be construed as limiting the scope of the invention but merely providing illustrations of some of the presently preferred embodiments of the invention.

Thus the scope of the invention should be determined by the appended claims and their legal equivalents, rather than by the examples given.

I claim a:

1. Method for displaying a set of images and synchronizable movies all of which are different views of the same object or space on a graphics display device, said method comprising the following steps:

a. associating with each image or movie frame the relative coordinates for projection purposes in three space of each of the vertices of the polygon created by the intersection of
      1) a plane passing through the point which is the center of focus of the image and perpendicular to a line from the camera which took the image to this point and
      2) the planes which define the field of view of the camera;

b. associating with the screen of the graphics display device the relative equation of a plane in three space to use for projection purposes;

c. associating with the operator a point in three space which represents the eye of the operator for projection purposes;

d. monitoring a clock and continuously determining which subset of images (which can be frames of movies) should appear given the starting times of the movies and the current time of the clock;

e. sorting the images in the current subset by distance between the 3-space point associated with the operator's eye and the centers of the 3-space polygons associated with the images and maintaining that sorted order by resorting if the operator's eye changes position;

f. projecting each image and movie frame in the current subset in reverse order by 1) calculating the points of intersection of
   a.) lines drawn between the vertices of the polygon associated with the image and the point which represents the eye, and
   b.) the view plane
2) mapping the image to the resulting two-dimensional polygon in the viewport thereby drawing a perspective transformation of the image on the screen and by redoing this whenever there is a change in the subset of images which should be shown or a change in the sorted order of this active ordered subset.

2. The method of claim 1 additionally comprising the steps of providing a "float-up" feature by continually monitoring the cursor and associating with it a point in three space relative to the view plane which corresponds to its position on the viewport and using that point instead of the point associated with the operator's eye for purposes of sorting the subset of images.

3. The method of claim 2 wherein the sorting function is modified to consider some contribution from the 2-space distance between the center of the two dimensional polygon which is the projection of the vertices of the image in 3-space and the cursor and not just the 3-space distance.

4. The method of claim 2 additionally comprising the step of providing a control to turn on and off the float-up feature.

5. The method of claim 1 additionally comprising the steps of providing the operator with controls for manipulating the viewport and whenever such controls are used to change the viewport, recalculating the equation of the view plane and coordinates of the operators eye and reprojecting the images.

6. The method of claim 5 with the additional step of constraining the viewport controls to keep the viewport generally within the montage.

7. The method of claim 1 additionally comprising the steps of providing a "bring-to-center" control and upon activation of this control, translating and rotating the montage so as to bring the currently selected image to the center of the screen free of distortions caused by perspective transformations, this rotation and translation being performed either upon the montage or equivalently on the view plane and coordinates associated with the eye.

8. The method of claim 7 additionally comprising the steps of providing the operator with a locking control for the "bring-to-center" control and upon application by the operator of this control to an image which is a frame in a movie, performing the rotation and translation of the "bring-to-center" control not just to the current frame but also to each subsequent frame of the movie whose associated coordinates are different than the coordinates associated with its predecessor.

9. The method of claim 7 wherein the translation/rotation used for the bring-to-center control is broken up into a number of smaller translation/rotations which are performed-with intermediate screen updates at a speed which allows them to be seen by the operator.

10. The method of claim 7 wherein the translation/rotation used for the bring-to-center control is broken up into a other translation/rotations which in combination produce the desired translation/rotation but which are not simply linear divisions of the needed translation/rotation but rather are designed to make the transition from one image to the next appear to be merely a shift of perspective on the same image.

11. The method of claim 10 where in the set of translation/rotations perform a "zoom-and-switch" translation/rotation by zooming into a region of similarity between the two pictures, panning across it and then switching images on movement and then zooming out on the second image.

12. The method of claim 1 wherein the coordinates associated with the images and the cursor are all assumed to be in the view plane to simplify calculations and create a two dimensional montage.

13. The method of claim 1 additionally comprising the steps of providing the operator with a outline-display control and, when the operator turns on this control, drawing on top of the total montage the outlines of any images which are hidden by images drawn on top of them.

14. The method of claim 1 additionally comprising the steps of providing the operator a cursor-sensitive outline-display control and, when the operator turns on this control, continuously monitoring the cursor position and displaying the outlines of any images which are both hidden by images drawn on top of them and for which the two dimensional screen coordinates of the cursor lies within the two-dimensional projected polygon to which the image is mapped and hiding the outlines when the cursor leaves the polygon.

15. The method of claim 1 wherein the cursor's coordinates in step e of claim 1 are not constrained to the view plane but are either based on a truly three-dimensional input device or are coerced into three dimensions through a two dimensional input device and an additional input which is used to set a third coordinate for the cursor which is reflected on the screen by growing or shrinking the cursor.

16. The method of claim 1 wherein whenever the eye is on the opposite side of the image than the camera was when the image was taken the complete image is not mapped but rather a blank image or a shaded one to indicate that the back of the image is being shown.

17. The method of claim 1 additionally comprising the steps of linking specific parts of the images to actuators for rotations and translations and continuously monitoring the cursor and changing the shape of the cursor on roll-over of these regions and then performing the linked rotations and translations when the user initiates the indicated action.

18. The method of claim 1 wherein the coordinates associated with the images are tweaked slightly to emphasize those parts of the images deemed most important for subjective reasons.

* * * * *